(12) United States Patent
Okabe et al.

(10) Patent No.: US 12,134,325 B2
(45) Date of Patent: Nov. 5, 2024

(54) FUEL CELL SYSTEM AND AIR VEHICLE

(71) Applicant: TOYOTA JIDOSHA KABUSHIKI KAISHA, Toyota (JP)

(72) Inventors: Hiroki Okabe, Mishima (JP); Kimio Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 17/659,779

(22) Filed: Apr. 19, 2022

(65) Prior Publication Data

US 2022/0340022 A1 Oct. 27, 2022

(30) Foreign Application Priority Data

Apr. 23, 2021 (JP) .................................. 2021-073157

(51) Int. Cl.
*B60L 50/75* (2019.01)
*B60L 58/40* (2019.01)
*B64D 27/24* (2024.01)
*B64D 41/00* (2006.01)

(52) U.S. Cl.
CPC .............. *B60L 50/75* (2019.02); *B60L 58/40* (2019.02); *B64D 27/24* (2013.01); *B64D 41/00* (2013.01); *B60L 2200/10* (2013.01); *B60L 2210/40* (2013.01); *B64D 2041/005* (2013.01)

(58) Field of Classification Search
CPC ...... B60L 50/75; B60L 58/40; B60L 2200/10; B60L 2210/40; B60L 15/007; B60L 3/0092; B60L 50/71; B60L 58/30; B60L 3/0053; B60L 2220/54; B64D 27/24; B64D 41/00; B64D 2041/005; H01M 2220/20; H01M 2250/20; H01M 16/006; H01M 8/04559; Y02E 60/50; Y02T 90/40; H02P 2207/076
See application file for complete search history.

(56) References Cited

U.S. PATENT DOCUMENTS

| | | | | |
|---|---|---|---|---|
| 7,701,156 B2* | 4/2010 | Okamura | ............... | B60K 6/365 |
| | | | | 701/55 |
| 8,273,490 B2* | 9/2012 | Umayahara | ............. | B60L 58/40 |
| | | | | 429/429 |
| 8,574,777 B2* | 11/2013 | Manabe | .................. | B60L 58/31 |
| | | | | 429/432 |

(Continued)

FOREIGN PATENT DOCUMENTS

CN 111231702 A 6/2020
EP 3667444 A1 * 6/2020 .............. G06F 11/27

(Continued)

*Primary Examiner* — Yonel Beaulieu
(74) *Attorney, Agent, or Firm* — Dickinson Wright, PLLC

(57) ABSTRACT

To provide a fuel cell system configured to charge a battery with maintaining the independence and redundancy of a fuel cell and a battery as power sources. A fuel cell system for air vehicles, wherein the fuel cell system comprises a fuel cell, a battery, a motor and a controller; wherein the fuel cell and the battery are connected to the motor as independent power sources, and the motor includes a double three-phase winding that uses a double inverter; and wherein, when normal output is requested from the motor, the controller operates the motor by a predetermined first output from the fuel cell, and the controller charges the battery by a torque generated in the motor.

4 Claims, 4 Drawing Sheets

(56) References Cited

U.S. PATENT DOCUMENTS

| | | | |
|---|---|---|---|
| 8,603,687 B2* | 12/2013 | Hamada | H01M 10/44 |
| | | | 429/428 |
| 8,728,678 B2* | 5/2014 | Hasegawa | H02J 7/34 |
| | | | 429/432 |
| 8,790,838 B2* | 7/2014 | Hasegawa | B60L 58/40 |
| | | | 363/15 |
| 9,450,261 B2* | 9/2016 | Hasegawa | B60L 58/40 |
| 9,643,517 B2* | 5/2017 | Watanabe | B60L 58/40 |
| 2008/0220298 A1* | 9/2008 | Ishikawa | H01M 8/04925 |
| | | | 429/431 |
| 2009/0033274 A1 | 2/2009 | Perisic et al. | |
| 2014/0023945 A1 | 1/2014 | Epstein et al. | |
| 2020/0112281 A1 | 4/2020 | Ziegltrum | |
| 2020/0328715 A1* | 10/2020 | Ossa | H02P 1/46 |
| 2023/0261493 A1* | 8/2023 | Lacaux | B60L 50/60 |
| | | | 320/137 |

FOREIGN PATENT DOCUMENTS

| | | | | |
|---|---|---|---|---|
| JP | H08331705 A | | 12/1996 | |
| JP | 2005183047 A | | 7/2005 | |
| JP | 2017081559 A | | 5/2017 | |
| WO | WO-2018204964 A1 * | | 11/2018 | B60L 50/60 |

\* cited by examiner

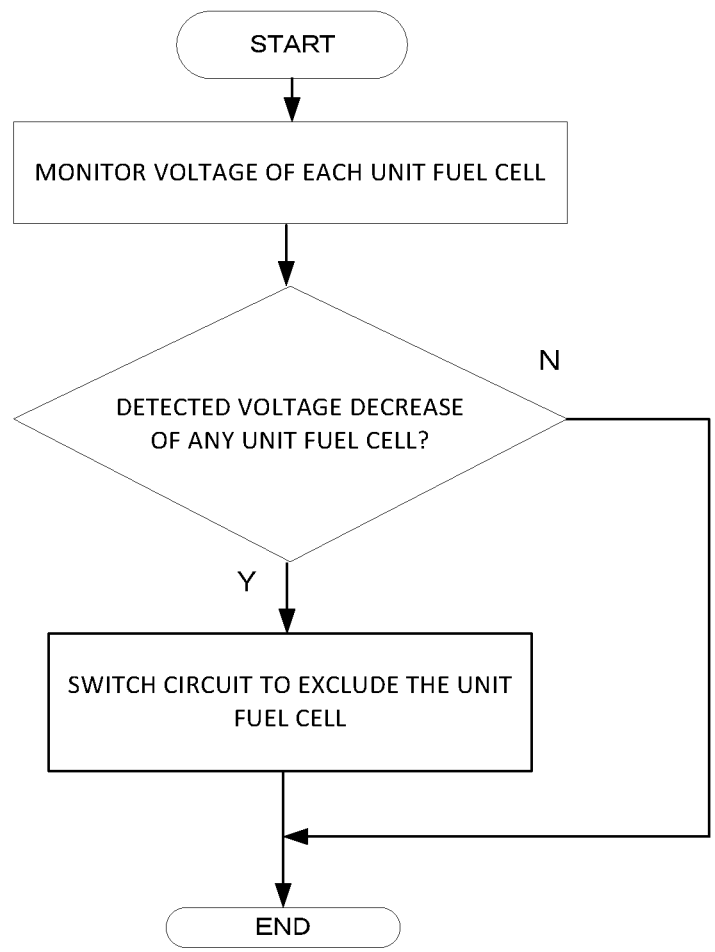

FUEL CELL SYSTEM AND AIR VEHICLE

TECHNICAL FIELD

The disclosure relates to a fuel cell system and an air vehicle.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various studies have been made on fuel cells.

For example, Patent Literature 1 discloses an aircraft using fuel cells.

Patent Literature 1: Japanese Patent Application Laid-Open (JP-A) No. 2017-081559

In the case of mounting a fuel cell in an air vehicle, compared to the case of mounting a fuel cell in a car, the air vehicle is susceptible to the weather.

As a fail-safe technique in fuel cells in case an air vehicle is affected by the weather or the like, there is a demand for increasing the reliability of fuel cells as a power source and increasing the output.

To balance an air vehicle (such as an aircraft) in response to a change in direction, the effects of an input from the outside (such as wind) and so on, it is sometimes necessary to repeatedly change the output of a fuel cell.

A fuel cell has an operating range in which the fuel efficiency of the fuel cell is good with respect to the output. Accordingly, depending on how the fuel cell is used, the power generation efficiency is low and the fuel efficiency deteriorates.

SUMMARY

The present disclosure was achieved in light of the above circumstances An object of the present disclosure is to provide a fuel cell system configured to charge a battery with maintaining the independence and redundancy of a fuel cell and a battery as power sources.

The fuel cell system of the present disclosure is a fuel cell system for air vehicles,
  wherein the fuel cell system comprises a fuel cell, a battery, a motor and a controller;
  wherein the fuel cell and the battery are connected to the motor as independent power sources, and the motor includes a double three-phase winding that uses a double inverter; and
  wherein, when normal output is requested from the motor, the controller operates the motor by a predetermined first output from the fuel cell, and the controller charges the battery by a torque generated in the motor.

When high output is requested from the motor, the controller may allow power generation of the fuel cell by the first output, may allow power generation of the battery by a predetermined second output, and may operate the motor by the output of the fuel cell and that of the battery.

A range of the second output may be a range in which a rotational direction of the motor is the same as the rotational direction of the motor when normal output is requested from the motor.

The fuel cell may be a fuel cell stack which is a stack of two or more unit fuel cells.

The fuel cell stack may comprise an end terminal, which is connected to the circuit, at both ends of the fuel cell stack, and the fuel cell stack may comprise at least one reserve terminal, which is connectable to the circuit, at any position other than the both ends of the fuel cell stack.

The circuit may comprise a switch.

The switch may switch the circuit between the end terminal and the at least one reserve terminal.

The fuel cell system may comprise a cell voltage sensor for measuring a voltage of each unit fuel cell of the fuel cell stack.

The controller may monitor the voltage of each unit fuel cell measured by the cell voltage sensor, and when the controller detects a voltage decrease of at least one unit fuel cell, the controller may switch the switch to exclude the unit fuel cell from the circuit.

The air vehicle of the preset disclosure is an air vehicle comprising the fuel cell system described above.

According to the fuel cell system of the present disclosure, the battery can be charged with maintaining the independence and redundancy of the fuel cell and the battery as the power sources.

BRIEF DESCRIPTION OF THE DRAWINGS

In the accompanying drawings,

FIG. 4 is a flowchart illustrating another example of control of the fuel cell system of the present disclosure.

DETAILED DESCRIPTION

1. First Embodiment

The fuel cell system of the present disclosure is a fuel cell system for air vehicles,
  wherein the fuel cell system comprises a fuel cell, a battery, a motor and a controller;
  wherein the fuel cell and the battery are connected to the motor as independent power sources, and the motor includes a double three-phase winding that uses a double inverter; and
  wherein, when normal output is requested from the motor, the controller operates the motor by a predetermined first output from the fuel cell, and the controller charges the battery by a torque generated in the motor.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell system of the present disclosure is mounted and used in an air vehicle.

The fuel cell system of the present disclosure may be mounted and used in an air vehicle that can fly by the power of a secondary cell.

The air vehicle of the present disclosure may be an aircraft. The aircraft may be an airplane, a vertical takeoff and landing aircraft or the like. The vertical takeoff and landing aircraft may be a helicopter, a drone or the like.

The air vehicle may include the fuel cell system of the present disclosure.

The fuel cell system includes a battery.

The battery (secondary cell) may be any chargeable and dischargeable cell. For example, the secondary cell may be a conventionally-known secondary cell such as a nickel-hydrogen secondary cell and a lithium ion secondary cell. The secondary cell may include a power storage device such as an electric double layer capacitor. The secondary cell may have a structure such that a plurality of secondary cells are connected in series. The charge and discharge of the secondary cell may be controlled by the controller.

The fuel cell system includes the motor.

The motor may be the motor of the rotor of the air vehicle, or it may be the motor of an air compressor.

The fuel cell and the battery are connected to the motor as independent power sources, and the motor includes the double three-phase winding that uses the double inverter.

Figure 1:
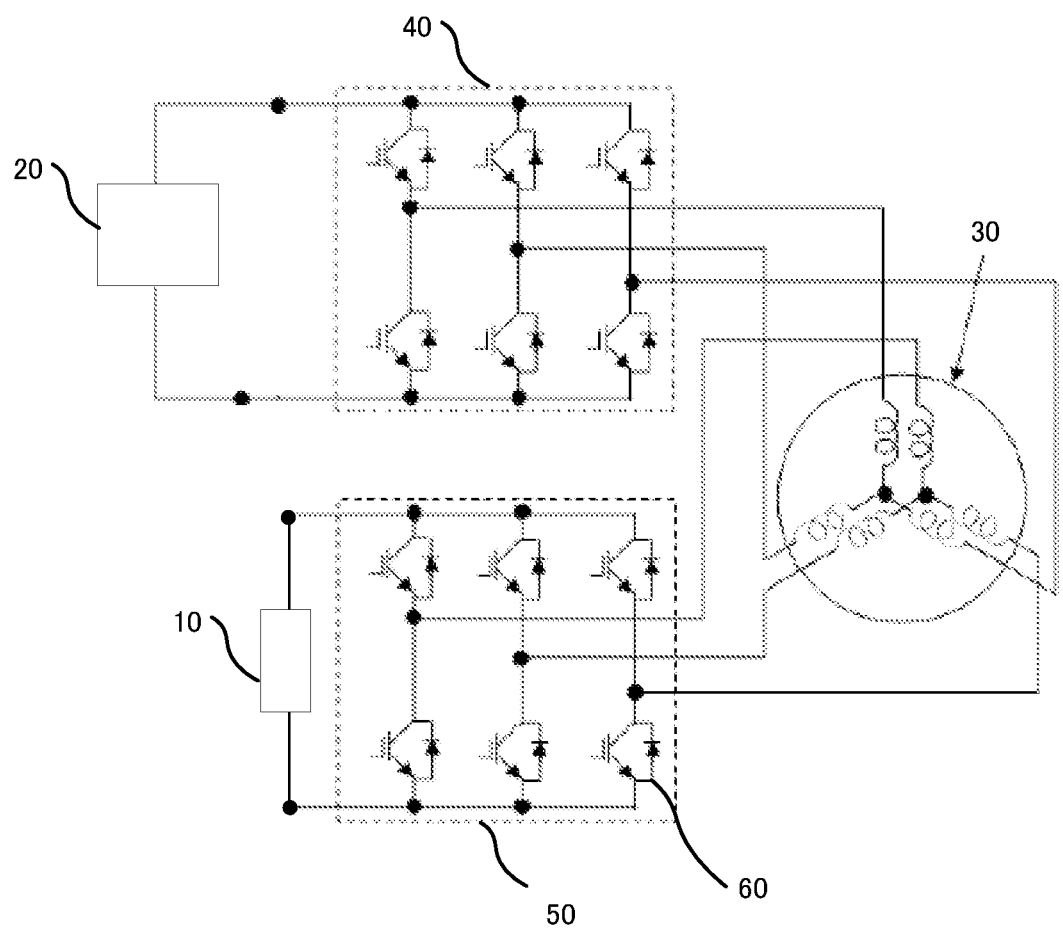
FIG. 1 is a schematic circuit diagram of an example of a system for operating a double three-phase motor by the double inverter used in the present disclosure.

FIG. 1 is a schematic circuit diagram of an example of a system for operating a double three-phase motor by the double inverter used in the present disclosure. The system shown in FIG. 1 is a system which includes a double three-phase winding motor 30 including a pair of three-phase windings and in which one of the pair of three-phase windings is operated by a first inverter 40, and the other is operated by a second inverter 50.

The double three-phase winding motor 30 is a motor in which the pair of three-phase windings, which are electrically connected to each other, are housed in a stator, and it is a dedicated motor based on operating the motor by two inverters.

A battery 20 is connected to the first inverter 40, which is one of the two inverters, and a fuel cell 10 is connected to a second inverter 50.

Each inverter is composed of 6 power devices 60, and based on a command from the controller, it supplies AC power to the double three-phase winding motor.

A converter 1 may be disposed between the battery 20 and the first inverter 40.

The converter 1 may step up the voltage of the battery 20 and supply the voltage to the first inverter 40.

A converter 2 may be disposed between the fuel cell 10 and the second inverter 50.

The converter 2 may step up the voltage of the fuel cell and supply the voltage to the second inverter 50.

The double three-phase motor operating system needs the dedicated motor. However, the output of the first inverter 40 and that of the second inverter 50 are electrically independent. Accordingly, even if one of the two inverters fails, the other inverter is not affected by this.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an operating switch which may be mounted in the air vehicle. The controller may be operable by an external power source even if the operating switch is turned OFF.

When normal output is requested from the motor, the controller operates the motor by the predetermined first output from the fuel cell, and the controller charges the battery by the torque generated in the motor.

The predetermined first output may be appropriately set considering the fuel cell output which is necessary when normal output is requested and the output which is necessary to charge the battery.

As the time when normal output is requested, examples include, but are not limited to, the time when the fuselage of the air vehicle stably flies, such as the time of leveling off.

When the motor torque may be small (such as the time when normal output is requested from the motor, a necessary torque is generated by the predetermined first output from the fuel cell as the power source, and power generation of the battery-side inverter is caused by the torque, thereby charging the battery. As a result of non-contact charging, which maintains the independence of the power sources, the motor can be operated by the output of the battery even when a failure occurs in the fuel cell.

The motor installed in the fuel cell system of the present disclosure, is the motor to which the fuel cell and the battery are connected as independent power sources and which includes the double three-phase winding that uses the double inverter. In this fuel cell system, a control to increase the power generation efficiency of the fuel cell, is performed in the situation where the motor can be operated only by the output of the fuel cell (such as the time when normal output is requested from the motor) and not in the situation where both the battery output and the fuel cell output are needed. The fuel cell constantly outputs the power which is acceptable to the battery and the minimum power which is needed to fly. Accordingly, the battery is charged by utilizing the characteristics of the power sources (the fuel cell and the battery) with maintaining the independence and redundancy of the power sources. Also, the fuel efficiency of the fuel cell is enhanced by utilizing the characteristics of the power sources (the fuel cell and the battery).

When high output is requested from the motor, the controller may allow power generation of the fuel cell by the first output, may allow power generation of the battery by a predetermined second output, and may operate the motor by the output of the fuel cell and that of the battery.

The range of the second output may be a range in which the rotational direction of the motor is the same as the rotational direction of the motor when normal output is requested from the motor. When the second output is too high, the motor is sometimes reversed and results in poor fuel efficiency. Accordingly, the fuel efficiency is enhanced by setting the range of the second output to the range in which the rotational direction of the motor is the same as the rotational direction of the motor when normal output is requested from the motor.

The motor installed in the fuel cell system of the present disclosure, is the motor to which the fuel cell and the battery are connected as independent power sources and which includes the double three-phase winding that uses the double inverter. In this fuel cell system, when a large motor torque is needed, power is obtained from the two power sources by utilizing the characteristics of the power sources (the fuel cell and the battery) with maintaining the independence and redundancy of the power sources. As the time when a large motor torque is needed, examples include, but are not limited to, the time when there is an input from the outside (such as wind) and the time when the air vehicle changes its direction.

More specifically, the propulsion of the air vehicle when a large motor torque is needed, is controlled as follows. Power generation of the battery-side inverter is conducted. At this time, power generation of the battery is conducted in the range in which the rotational direction of the motor is not reversed. The fuel cell constantly outputs the power which is acceptable to the battery and the minimum power which is needed to fly. Accordingly, the fuel efficiency of the fuel cell is enhanced by utilizing the characteristics of the power sources (the fuel cell and the battery).

To determine whether high output is requested from the motor or not, the fuel cell system may include an angle sensor and a gravity acceleration sensor, for example.

The angle sensor measures the inclined angle of the air vehicle.

The angle sensor is electrically connected to the controller. The controller detects the inclined angle of the air vehicle measured by the angle sensor. The controller detects the inclined angle of the air vehicle. When the inclined angle of the air vehicle is larger than a predetermined angle, it may be considered that there was an input from the outside or the air vehicle changed its direction, for example. The predetermined inclined angle may be appropriately set based on an empirical rule.

As the angle sensor, a conventionally-known angle gauge or the like may be used.

The gravity acceleration sensor measures the gravity acceleration applied to the air vehicle.

The gravity acceleration sensor is electrically connected to the controller. The controller detects the gravity acceleration applied to the air vehicle measured by the gravity acceleration sensor. The controller detects the gravity acceleration applied to the air vehicle. When the gravity acceleration applied to the air vehicle is larger than a predetermined gravity acceleration, it may be considered that there was an input from the outside, for example. The predetermined gravity acceleration may be appropriately set based on an empirical rule.

As the gravity acceleration sensor, a conventionally-known accelerometer or the like may be used.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

When the fuel cell is a fuel cell stack which is a stack of two or more unit fuel cells, the fuel cell stack may include an end terminal, which is connected to the circuit, at both ends of the fuel cell stack, and the fuel cell stack may include at least one reserve terminal, which is connectable to the circuit, at any position other than the both ends of the fuel cell stack.

The end terminal may be connected to the circuit of the second inverter or the converter 2.

The fuel cell stack may include at least one reserve terminal. When the number of stacked unit fuel cells is set to n, the fuel cell stack may include (n−1) unit fuel cells at a maximum.

The circuit comprises a switch.

The switch switches the circuit between the end terminal and the at least one reserve terminal.

The circuit may include several switches, or switches corresponding to the terminals may be disposed in the circuit. Connection and disconnection of the terminals to the circuit may be switched by the switches corresponding to the terminals.

As the switch (switching device), examples include, but are not limited to, IGBT and MOSFET.

The fuel cell system may include a cell voltage sensor.

The fuel cell system measures the voltage of each unit fuel cell of the fuel cell stack.

The cell voltage sensor is electrically connected to the controller, and the controller detects the voltage of each unit fuel cell of the fuel cell stack measured by the cell voltage sensor.

As the cell voltage sensor, a conventionally-known voltmeter or the like may be used.

The controller may monitor the voltage of each unit fuel cell measured by the cell voltage sensor, and when the controller detects a voltage decrease of at least one unit fuel cell, the controller may switch the switch to exclude the unit fuel cell from the circuit.

If a malfunction occurs in one of the unit fuel cells of the fuel cell stack, the output of the whole fuel cell stack is decreased. In the present disclosure, the at least one reserve terminal and the switch for switching the circuit between the end terminal and the at least one reserve terminal, may be disposed between the unit fuel cells of the fuel cell stack, and when the cell voltage sensor detects a cell voltage decrease, which is a malfunction, the circuit is switched. Accordingly, a circuit configuration which is usable even when the voltage of the fuel cell is decreased, is obtained.

Figure 2:
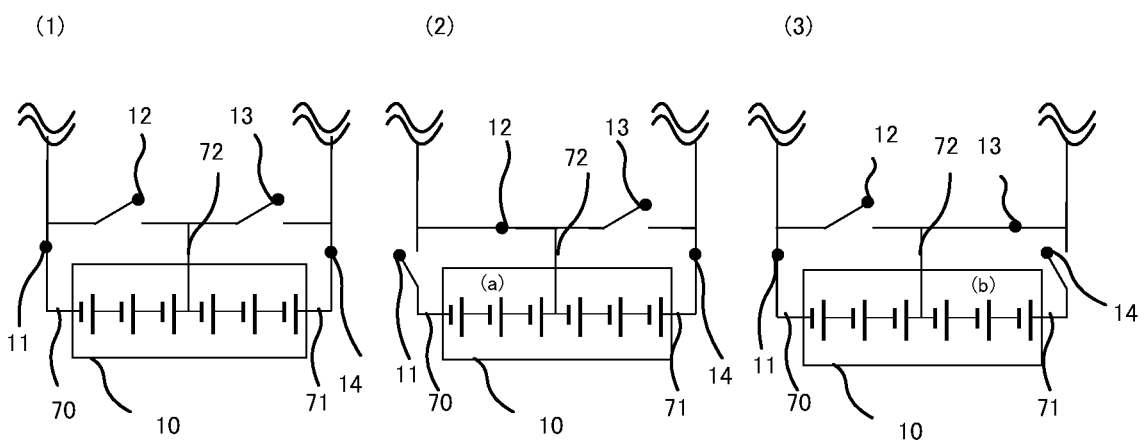
FIG. 2 shows schematic diagrams (1) to (3) illustrating the vicinity of the fuel cell of the circuit used in the present disclosure; the diagram (1) shows an example of the fuel cell in normal operation; the diagram (2) shows an example of a unit fuel cell (a) in a malfunctioning state; and the diagram (3) shows a unit fuel cell (b) in a malfunctioning state.

FIG. 2 shows schematic diagrams (1) to (3) illustrating the vicinity of the fuel cell of the circuit used in the present disclosure; the diagram (1) shows an example of the fuel cell in normal operation; the diagram (2) shows an example of a unit fuel cell (a) in a malfunctioning state; and the diagram (3) shows a unit fuel cell (b) in a malfunctioning state.

The circuit shown in FIG. 2 includes a fuel cell stack 10, a first switch 11, a second switch 12, a third switch 13, a fourth switch 14, a first end terminal 70, a second end terminal 71, and a reserve terminal 72. Double wavy lines indicate the omission of a circuit(s) that lies ahead. The omitted part may be connected to the converter 2 or the second inverter.

As shown in the diagram (1), when the fuel cell is in normal operation, the first switch 11 and the fourth switch 14 are turned on; the second switch 12 and the third switch 13 are turned off; the first end terminal 70 and the second end terminal 71 are connected to the circuit; and power can be output from all of the unit fuel cells of the fuel cell 10.

As shown in the diagram (2), when the unit fuel cell (a) is in a malfunctioning state, the second switch 12 and the fourth switch 14 are turned on; the first switch 11 and the third switch 13 are turned off; the reserve terminal 72 and the second end terminal 71 are connected to the circuit; and power can be output from the unit fuel cells other than some unit fuel cells including the unit fuel cell (a) of the fuel cell 10.

As shown in the diagram (3), when the unit fuel cell (b) is in a malfunctioning state, the first switch 11 and the third switch 13 are turned on; the second switch 12 and the fourth switch 14 are turned off; the first end terminal 70 and the reserve terminal 72 are connected to the circuit; and power can be output from the unit fuel cells other than some unit fuel cells including the unit fuel cell (b) of the fuel cell 10.

When some unit fuel cells are in a malfunctioning state, as shown in the diagrams (2) and (3), a decrease in the output of the whole fuel cell stack can be suppressed by switching the circuit.

The fuel cell system may include a fuel gas system.

The fuel gas system supplies fuel gas to the fuel cell.

The fuel gas system may include a fuel gas supplier and a gas and water discharge valve.

The fuel gas system may further include a fuel gas supply flow path, an ejector, a circulation flow path, a gas-liquid separator, a fuel off-gas discharge flow path and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the air vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel cell system may include an oxidant gas system.

The oxidant gas system may include an oxidant gas supplier, an oxidant gas supply flow path, an oxidant off-gas discharge flow path, an oxidant gas bypass flow path, a bypass valve, an oxidant gas flow rate sensor, and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the junction of the oxidant off-gas discharge flow path.

The bypass valve is disposed in the oxidant gas bypass flow path.

The bypass valve is electrically connected to the controller. By opening the bypass valve by the controller, when it is unnecessary to supply the oxidant gas to the fuel cell, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The fuel cell system may include the cooling system of the fuel cell.

The cooling system may include a refrigerant supplier and a refrigerant circulation flow path.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

Figure 3:
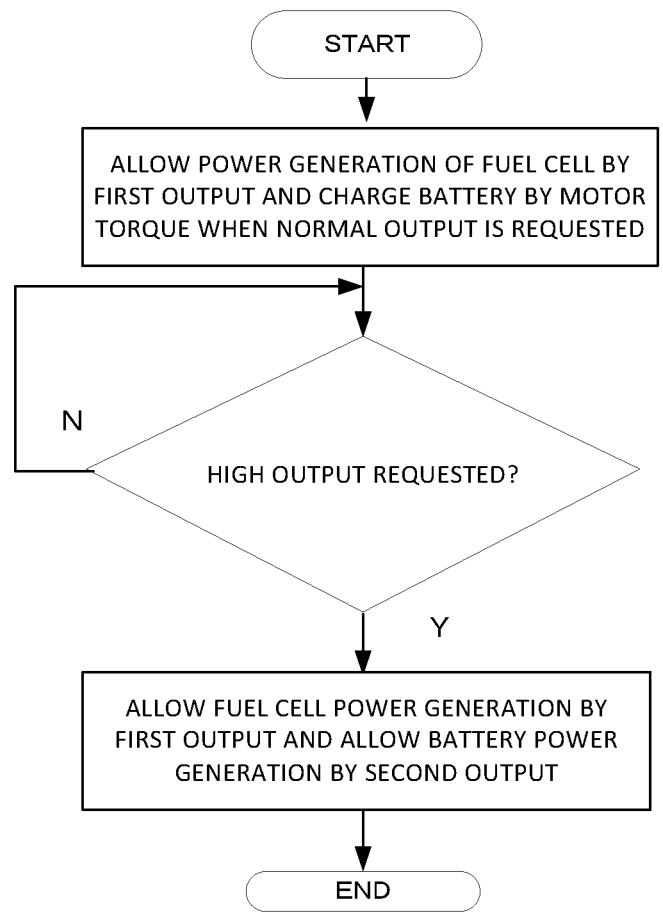
FIG. 3 is a flowchart illustrating an example of control of the fuel cell system of the present disclosure.

FIG. 3 is a flowchart illustrating an example of control of the fuel cell system of the present disclosure.

When normal output is requested from the motor, the controller operates the motor by the predetermined first output from the fuel cell, and the controller charges the battery by the torque generated in the motor.

The controller determines whether high output is requested from the motor or not.

When the controller determines that high output is requested from the motor, the controller allows the power generation of the fuel cell by the predetermined first output, allows the power generation of the battery by the predetermined second output, operates the motor by the output of the fuel cell and that of the battery, and ends the control.

On the other hand, when the controller determines that high output is not requested from the motor, the controller maintain the control to operate the motor by the predetermined first output from the fuel cell and charge the battery by the torque generated in the motor.

FIG. 4 is a flowchart illustrating another example of control of the fuel cell system of the present disclosure.

First, the controller monitors the voltage of each unit fuel cell measured by the cell voltage sensor.

Next, the controller determines whether the voltage of each unit fuel cell measured by the cell voltage sensor has decreased or not.

Next, when the controller detects a voltage decrease of at least one of the unit fuel cells, the controller switches the switch to exclude the unit fuel cell from the circuit, and the controller ends the control.

On the other hand, when the controller does not detect a voltage decrease of any of the unit fuel cells, the controller may end the control, or it may continue to monitor the voltage of each unit fuel cell.

2. Second Embodiment

The fuel cell system of the present disclosure is a fuel cell system for air vehicles,
  wherein the fuel cell system comprises a fuel cell, a battery, a motor and a controller;
  wherein the fuel cell and the battery are connected to the motor as independent power sources, and the motor includes a double three-phase winding that uses a double inverter; and
  wherein, when high output is requested from the motor, the controller allows power generation of the fuel cell by a predetermined first output, allow power generation of the battery by a predetermined second output, and operates the motor by the output of the fuel cell and that of the battery.

In the second embodiment, when a large motor torque is needed, power is obtained from the two power sources by utilizing the characteristics of the power sources (the fuel cell and the battery) with maintaining the independence and redundancy of the power sources.

In the fuel cell system of the second embodiment, the range of the second output may be the range in which the rotational direction of the motor is the same as the rotational direction of the motor when normal output is requested from the motor.

The propulsion of the air vehicle when a large motor torque is needed, is controlled as follows. Power generation of the battery-side inverter is conducted. At this time, power generation of the battery is conducted in the range in which the rotational direction of the motor is not reversed. The fuel cell constantly outputs the power which is acceptable to the battery and the minimum power which is needed to fly. Accordingly, the fuel efficiency of the fuel cell is enhanced by utilizing the characteristics of the power sources (the fuel cell and the battery).

In the fuel cell system of the second embodiment, when normal output is requested from the motor, the controller may operate the motor by the predetermined first output from the fuel cell, and the controller may charge the battery by the torque generated in the motor Accordingly, a control to increase the power generation efficiency of the fuel cell, is performed in the situation where the motor can be operated only by the output of the fuel cell (such as the time when normal output is requested from the motor) and not in the situation where both the battery output and the fuel cell output are needed. The fuel cell constantly outputs the power which is acceptable to the battery and the minimum power which is needed to fly. Accordingly, the battery is charged by utilizing the characteristics of the power sources (the fuel cell and the battery) with maintaining the independence and redundancy of the power sources.

In the fuel cell system of the second embodiment,
the fuel cell may be a fuel cell stack which is a stack of two or more unit fuel cells;
the fuel cell stack may include an end terminal, which is connected to the circuit, at both ends of the fuel cell stack, and the fuel cell stack may include at least one reserve terminal, which is connectable to the circuit, at any position other than the both ends of the fuel cell stack;
the circuit may include a switch;
the switch may switch the circuit between the end terminal and the at least one reserve terminal;
the fuel cell system may include a cell voltage sensor for measuring a voltage of each unit fuel cell of the fuel cell stack; and
the controller may monitor the voltage of each unit fuel cell measured by the cell voltage sensor, and when the controller detects a voltage decrease of at least one unit fuel cell, the controller may switch the switch to exclude the unit fuel cell from the circuit.

Accordingly, a circuit configuration which is usable even when the voltage of the fuel cell is decreased, is obtained.

As the fuel cell, motor, battery, controller, circuit, cell voltage sensor, angle sensor, gravity acceleration sensor and so on of the second embodiment, examples include, but are not limited to, those exemplified above in the first embodiment.

3. Third Embodiment

The fuel cell system of the present disclosure is a fuel cell system for air vehicles,
wherein the fuel cell system comprises a fuel cell, a battery, a motor and a controller;
wherein the fuel cell and the battery are connected to the motor as independent power sources, and the motor includes a double three-phase winding that uses a double inverter;
wherein the fuel cell is a fuel cell stack which is a stack of two or more unit fuel cells;
wherein the fuel cell stack comprises an end terminal, which is connected to the circuit, at both ends of the fuel cell stack, and the fuel cell stack comprises at least one reserve terminal, which is connectable to the circuit, at any position other than the both ends of the fuel cell stack;
wherein the circuit comprises a switch;
wherein the switch switches the circuit between the end terminal and the at least one reserve terminal;
wherein the fuel cell system comprises a cell voltage sensor for measuring a voltage of each unit fuel cell of the fuel cell stack; and
wherein the controller monitors the voltage of each unit fuel cell measured by the cell voltage sensor, and when the controller detects a voltage decrease of at least one unit fuel cell, the controller switches the switch to exclude the unit fuel cell from the circuit.

In the third embodiment, the at least one reserve terminal and the switch for switching the circuit between the end terminal and the at least one reserve terminal, may be disposed inside the fuel cell stack, and when the cell voltage sensor detects a cell voltage decrease, which is a malfunction, the circuit is switched. Accordingly, a circuit configuration which is usable even when the voltage of the fuel cell is decreased, is obtained.

In fuel cell system of the third embodiment, when normal output is requested from the motor, the controller operates the motor by a predetermined first output from the fuel cell, and the controller charges the battery by a torque generated in the motor.

Accordingly, a control to increase the power generation efficiency of the fuel cell, is performed in the situation where the motor can be operated only by the output of the fuel cell (such as the time when normal output is requested from the motor) and not in the situation where both the battery output and the fuel cell output are needed. The fuel cell constantly outputs the power which is acceptable to the battery and the minimum power which is needed to fly. Accordingly, the battery is charged by utilizing the characteristics of the power sources (the fuel cell and the battery) with maintaining the independence and redundancy of the power sources. Also, the fuel efficiency of the fuel cell is enhanced by utilizing the characteristics of the power sources (the fuel cell and the battery).

In fuel cell system of the third embodiment, when high output is requested from the motor, the controller may allow power generation of the fuel cell by the first output, may allow power generation of the battery by a predetermined second output, and may operate the motor by the output of the fuel cell and that of the battery.

Accordingly, when a large motor torque is needed, power is obtained from the two power sources by utilizing the characteristics of the power sources (the fuel cell and the battery) with maintaining the independence and redundancy of the power sources.

In the fuel cell system of the third embodiment, the range of the second output may be the range in which the rotational direction of the motor is the same as the rotational direction of the motor when normal output is requested from the motor.

The propulsion of the air vehicle when a large motor torque is needed, is controlled as follows. Power generation of the battery-side inverter is conducted. At this time, power generation of the battery is conducted in the range in which the rotational direction of the motor is not reversed. The fuel cell constantly outputs the power which is acceptable to the battery and the minimum power which is needed to fly. Accordingly, the fuel efficiency of the fuel cell is enhanced by utilizing the characteristics of the power sources (the fuel cell and the battery).

As the fuel cell, motor, battery, controller, circuit, cell voltage sensor, angle sensor, gravity acceleration sensor and so on of the third embodiment, examples include, but are not limited to, those exemplified above in the first embodiment.

REFERENCE SIGNS LIST

10. Fuel cell (fuel cell stack)
11. First switch
12. Second switch
13. Third switch
14. Fourth switch
20. Battery
30. Double three-phase winding motor
40. First inverter
50. Second inverter
60. Power device
70. First end terminal
71. Second end terminal
72. Reserve terminal

The invention claimed is:

1. A fuel cell system for air vehicles,
wherein the fuel cell system comprises a fuel cell, a battery, a motor and a controller;
wherein the fuel cell and the battery are connected to the motor as independent power sources, and the motor includes a double three-phase winding that uses a double inverter; and
wherein, when normal output is requested from the motor, the controller operates the motor by a predetermined first output from the fuel cell, and the controller charges the battery by a torque generated in the motor;
wherein the fuel cell is a fuel cell stack which is a stack of two or more unit fuel cells;
wherein the fuel cell stack comprises an end terminal, which is connected to the circuit, at both ends of the fuel cell stack, and the fuel cell stack comprises at least one reserve terminal, which is connectable to the circuit, at any position other than the both ends of the fuel cell stack;
wherein the circuit comprises a switch;
wherein the switch switches the circuit between the end terminal and the at least one reserve terminal;
wherein the fuel cell system comprises a cell voltage sensor for measuring a voltage of each unit fuel cell of the fuel cell stack; and
wherein the controller monitors the voltage of each unit fuel cell measured by the cell voltage sensor, and when the controller detects a voltage decrease of at least one unit fuel cell, the controller switches the switch to exclude the unit fuel cell from the circuit.

2. The fuel cell system according to claim 1, wherein, when high output is requested from the motor, the controller allows power generation of the fuel cell by the first output, allows power generation of the battery by a predetermined second output, and operates the motor by the output of the fuel cell and that of the battery.

3. The fuel cell system according to claim 2, wherein a range of the second output is a range in which a rotational direction of the motor is the same as the rotational direction of the motor when normal output is requested from the motor.

4. An air vehicle comprising the fuel cell system defined by claim 1.

* * * * *